United States Patent
Johansson et al.

(10) Patent No.: US 9,516,562 B2
(45) Date of Patent: Dec. 6, 2016

(54) NEIGHBOUR INFORMATION UPDATE IN A CELLULAR SYSTEM

(75) Inventors: Magnus Johansson, Göteborg (SE); Magnus Gannholm, Mölnlycke (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1073 days.

(21) Appl. No.: 12/673,031

(22) PCT Filed: Aug. 13, 2007

(86) PCT No.: PCT/SE2007/050546
§ 371 (c)(1),
(2), (4) Date: Feb. 11, 2010

(87) PCT Pub. No.: WO2009/022951
PCT Pub. Date: Feb. 19, 2009

(65) Prior Publication Data
US 2011/0269500 A1    Nov. 3, 2011

(51) Int. Cl.
*H04W 36/00*    (2009.01)

(52) U.S. Cl.
CPC ............................... *H04W 36/0083* (2013.01)

(58) Field of Classification Search
CPC ........... H04W 28/08; H04W 36/0072; H04W 36/14; H04W 84/045; H04W 36/00; H04W 36/0016; H04W 36/0066; H04W 36/18
USPC ............................................. 455/436, 439, 442
See application file for complete search history.

(56) References Cited

U.S. PATENT DOCUMENTS

2006/0229075 A1* 10/2006 Kim et al. ..................... 455/436
2008/0051086 A2* 2/2008 Etemad et al. ............... 455/436
2008/0051087 A1* 2/2008 Ryu et al. ..................... 455/436

\* cited by examiner

*Primary Examiner* — Tu X Nguyen

(57) ABSTRACT

A method for a cellular system with a plurality of cells with mobile terminals, MSs, and a plurality of Base Stations, BSs. An MS can be handed over from a first BS to a second BS. The method comprises letting the second BS inform the first BS that an update has taken place in the system information of the second BS, and also comprises letting the first BS acquire the updated system information of the second BS, and letting the first BS transmit at least part of the updated system information of the second BS to MSs in the cell of the first BS.

16 Claims, 4 Drawing Sheets

NEIGHBOUR INFORMATION UPDATE IN A CELLULAR SYSTEM

TECHNICAL FIELD

The present invention discloses a method for improved neighbour information update in a cellular system.

BACKGROUND

Cellular wireless access networks such as, for example, GSM, WCDMA and Mobile WiMAX networks, comprise a number of Base Stations, BSs, with each BS covering a geographical area, a so called cell. In each cell, there can be a number of mobile terminals or stations, MSs, and the traffic to and from the MSs in a cell is routed via the BS of that cell.

The MSs in the networks exemplified above can move between the cells, and there will be a so called "handover" made of an MS from the BS of one cell to the BS of another cell as the MS moves between those cells.

An MS which is in the so called active state can have a number of services ongoing, such as, for example, voice calls, video streaming, or best effort file download or upload. When there is a handover of an MS between BSs, the end user, i.e. the user of the MS, expects all ongoing services to be maintained, which is known as session continuity.

In order to enable handovers with a high degree of session continuity, each BS may obtain and broadcast information to its MSs about neighbouring BSs, so that an MS will be able to synchronize quickly to a new BS, and to have access to the system information of the new BS even before the handover is performed. This functionality serves to reduce the handover interruption time, and is applied, for example, in the mobile WiMAX system.

In mobile WiMAX, the BSs exchange system information with each other, in order to be able to broadcast that information to their MSs. The system information exchanged between BSs in the WiMAX system consists of a counter which is updated each time that a change is made to the system information of that BS. When an MS in the WiMAX system is handed over to a new BS, the MS will need to receive system information for the new BS, which it will receive from the new BS, which may take several seconds, during which time there may be an interruption in the services provided by the MS in question.

SUMMARY

As described above, there is thus a need for a mechanism in the WiMAX system by means of which handovers of an MS from one BS to another BS may be performed without the interruptions caused at present by the need for an MS to acquire updated system information for the BS to which it will be handed over.

This need is addressed by the present invention in that it discloses a method for use in a wireless cellular telecommunications system with a plurality of cells which each can accommodate a number of users with mobile terminals, MSs. In the system in which the invention can be applied there is also a plurality of Base Stations, BSs, and the traffic to and from the MSs in a first cell is routed via a first BS of that cell.

In the system, an MS can be handed over from the first BS to a second BS of a second cell in the system, and the method of the invention comprises:

letting the second BS inform the first BS that an update has taken place in the system information of the second BS, letting the first BS acquire the updated system information of the second BS, letting the first BS transmit at least part of the updated system information of the second BS to MSs in the cell of the first BS.

Naturally, the same principle can be applied for all the cells which are neighbour cells of the first cell, so that the MS of the first cell can perform handover to any neighbouring cell with reduced delays. Equally naturally, the principle can be applied to all of the cells of the system, so that all handovers can take place with reduced delays.

In one embodiment of the invention, the updated system information is requested by the first BS from the second BS as a result of a message from the second BS that its system information has been updated. The message regarding the updated system information can be transmitted from the second BS periodically, at predefined intervals, or it can be transmitted as the result of an update.

Thus, by means of the invention, MSs in the first cell will receive updated system information regarding the second cell, which will reduce the need to spend time at a handover of the MS from the first cell to the second cell in order to update the MS with respect to the system information of the second cell. This and other advantages of the present invention will become even more evident from the following detailed description.

BRIEF DESCRIPTION OF THE DRAWINGS

The invention will be described in more detail in the following, with reference to the appended drawings, in which.

DETAILED DESCRIPTION

Figure 1:
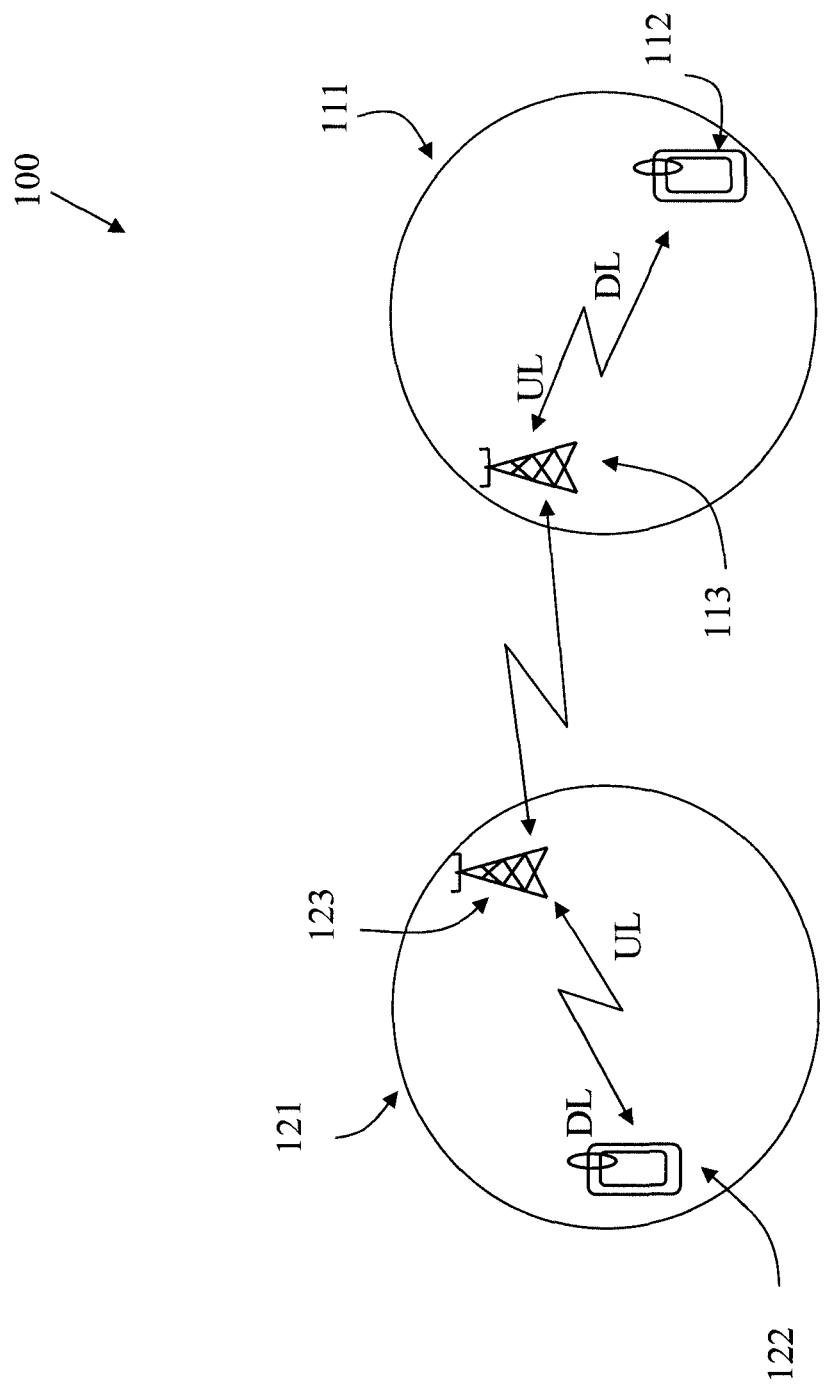
FIG. 1 shows an overview of a system in which the invention may be applied.

FIG. 1 shows an overview of a part of a system 100 in which the invention may be applied. The system 100 of FIG. 1 is a cellular wireless access network with a plurality of cells, two of which, 111, 121 are shown in FIG. 1. In each cell there can be a number of Mobile Stations, MSs, and as an example of this, FIG. 1 shows one MS each 112, 122 in the cells 111, 121.

In addition, the system 100 comprises a number of Base Stations, BSs, one for each of the cells 111, 121, with the corresponding base stations of those cells being shown as 113, 123 in FIG. 1. The function of the BSs varies between different standards, but in most systems, the traffic to and from an MS in a cell is routed via the BS of that cell.

Traffic from the BSs to the MSs is referred to as Down Link, DL, traffic, while traffic in the other direction, i.e. from the MSs to the BSs is referred to as Up Link, UL, traffic.

As is well known to those skilled in the art, an MS can be "handed over" from one cell to another cell, meaning that the BS through which the traffic of an MS is routed will be changed. A handover is performed if certain handover criteria are fulfilled, such as, for example, if the signal strength received by an MS from a "new" BS exceeds the strength of the signal received by its present BS by a certain amount, and does so for a certain amount of time.

A handover may be initiated by different nodes in the system, depending on the system standard, but according to the WiMAX standard, a handover is normally initiated by the MS. In order to facilitate handovers, the BSs of a WiMAX system may broadcast information about their neighbour BSs, so that MSs will be able to quickly synchronize to neighbouring BSs, and to have access to their system information already before the handover. This functionality reduces the handover interruption time.

In Mobile WiMAX, the message MOB_NRB-ADV is used by BSs to communicate system information of neighbouring BSs to MSs, and the message Spare Capacity Report is used between BSs to exchange information. Both of these messages are transmitted periodically, with the system also comprising the possibility of letting the Spare Capacity Report be transmitted periodically, or upon request.

The message Spare Capacity Report primarily comprises the following:

Available radio resource in DL and UL,
DCD/UCD Configuration Change Count, which is optional.

DCD is an abbreviation for Downlink Channel Descriptor, and UCD stands for Uplink Channel Descriptor, both of which are control messages which comprise system information about the respective link, DL and UL.

The information about the available radio resources in downlink and uplink can typically be used by a BS in order to decide to accept handover to a neighbouring BS or not.

The Configuration Change Counts, CCC, are information elements included in the channel descriptors DCD and UCD. When the information comprised in the DCD or UCD is updated, the corresponding CCC is increased by one. In this way, a BS will be able to detect if the system information in a neighbouring BS has been updated. However, there is at present no possibility in the WiMAX system for a BS to know which system information in the neighbour BS that was updated, and thus caused the increment of the CCC.

When an MS in a WiMAX system performs handover to a target BS, it checks if the CCC of DCD and UCD are the same as the CCC received in MOB_NRB-ADV in the serving BS. If the CCC values are not the same, the MS will need to receive the DCD and UCD in its new BS before the MS can start transmitting and receiving. This may take several seconds, and during that time there will be an interruption or degradation in the service given by the MS.

Such interruptions or degradation can be reduced or eliminated by the present invention, since a principle behind the present invention is that when a BS detects that system information in a neighbouring BS has changed, it will acquire the updated information, and update the information it broadcasts to its MSs in a corresponding manner. This can be described with reference to the system 100 of FIG. 1 as follows:

A second BS such as, for example, the BS 123 of FIG. 1, informs a first BS such as the BS 113 that an update has taken place in the system information of the second BS 123, The first BS 113 acquires the updated system information of the second BS 123, The first BS 113 transmits at least part of the updated system information of the second BS 123 to MSs such as the MS 112 in the cell of the first BS.

The first BS, i.e. the BS that acquires the updated system information of the second BS 123, suitably does so in a dedicated message for this, although it is also conceivable to use existing messages to send the information. A dedicated or an existing message may also be used to request the information.

If dedicated messages are used, those messages may be named DCD UCD Request, and DCD UCD Response, those names naturally merely being examples.

In a particular embodiment of the invention, the updated system information is requested by the first BS 113 from the second BS 123 as a result of a message from the second BS that its system information has been updated. This "update" message is, in the embodiment in question, the message that the CCC of either the UCD or the DCD has been updated.

Figure 2:
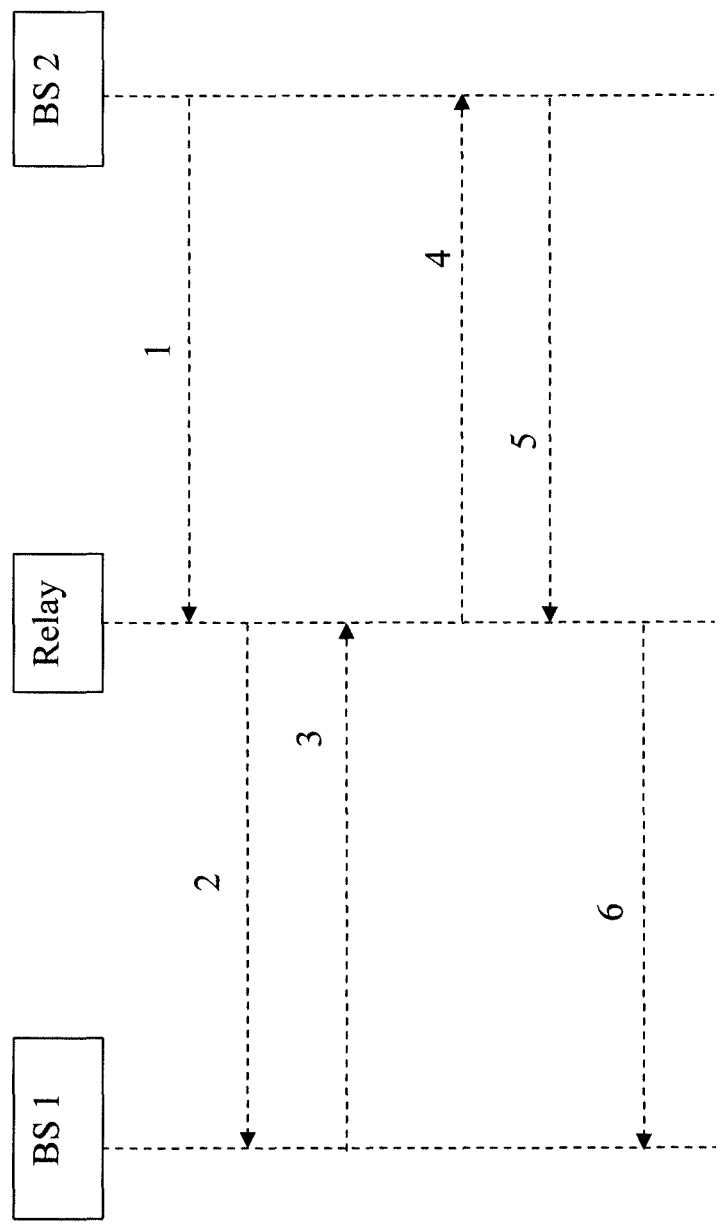
FIG. 2 shows a message exchange according to the present invention.

The principle can be explained in more detail with reference to FIG. 2, which is an event diagram of a sequence which may occur when the invention is applied. Apart from including the two Base Stations, which are shown as BS1 and BS2, the figure also includes a box referred to as "Relay", which is due to the fact that in the WiMAX standard two BSs may not be able to exchange information directly with each other. Thus, the information has to pass through a third node in the system, which can relay the information between the two BSs. Usually, the third node will be the Access Service Network Gateway, the ASN-GW.

The event sequence is as follows in the example shown in FIG. 2, the numbers below corresponding to those shown on the arrows in FIG. 2:

1. BS2 sends a Spare Capacity Report to BS1, which message includes the CCC of the UCD and/or the DCD. In this case, the CCC in question has been updated compared to the previous time the message was received by BS1.
2. The Spare Capacity Report is relayed by the ASN GW to BS1.
3. BS1 notices that the CCC of the DCD or the UCD has been updated, which triggers BS1 to send a DCD UCD Request.
4. The DCD UCD Request is relayed by the ASN GW to BS2.
5. BS2 sends a DCD UCD Response, the contents of which will be exemplified in more detail later in this text.
6. The ASN GW relays the DCD UCD Response to BS1, which may, for example, use the updated information in order to transit all or parts of it to the MSs of BS1.

Examples of the contents of the DCD UCD Request could be flags which indicate if the requesting BS requests updated DCD Settings, updated UCD Settings, or both.

Examples of the contents of the DCD UCD Response could be the following:

DCD Settings. A compound information element, IE, which comprises the complete DCD message. This IE should only be included in the DCD UCD Response if it was flagged in Requested information in the DCD UCD Request.

UCD Settings. A compound IE which comprises the complete UCD message. This IE should only be included in the DCD UCD Response if it was flagged in Requested information in DCD UCD Request.

Channel bandwidth.

Preamble index. Each DL transmission starts with a preamble which differs between the cells.

Mobility features supported by the responding BS, i.e. in this case BS 2.

The reason for including the channel bandwidth, the preamble index and the mobility features supported are that this is information which is broadcasted in MOB_NBR_ADV but not in DCD or UCD.

As mentioned previously in this text, the updated system information may be requested by the first BS 113 from the second BS 123 as a result of a message from the second BS 123 that its system information has been updated. The message from BS 123 that its system information has been updated may be transmitted by that BS periodically, at predefined intervals, as an alternative to which the message can be transmitted "event triggered", i.e. as the result of an update of the system information of the BS.

Figure 3:
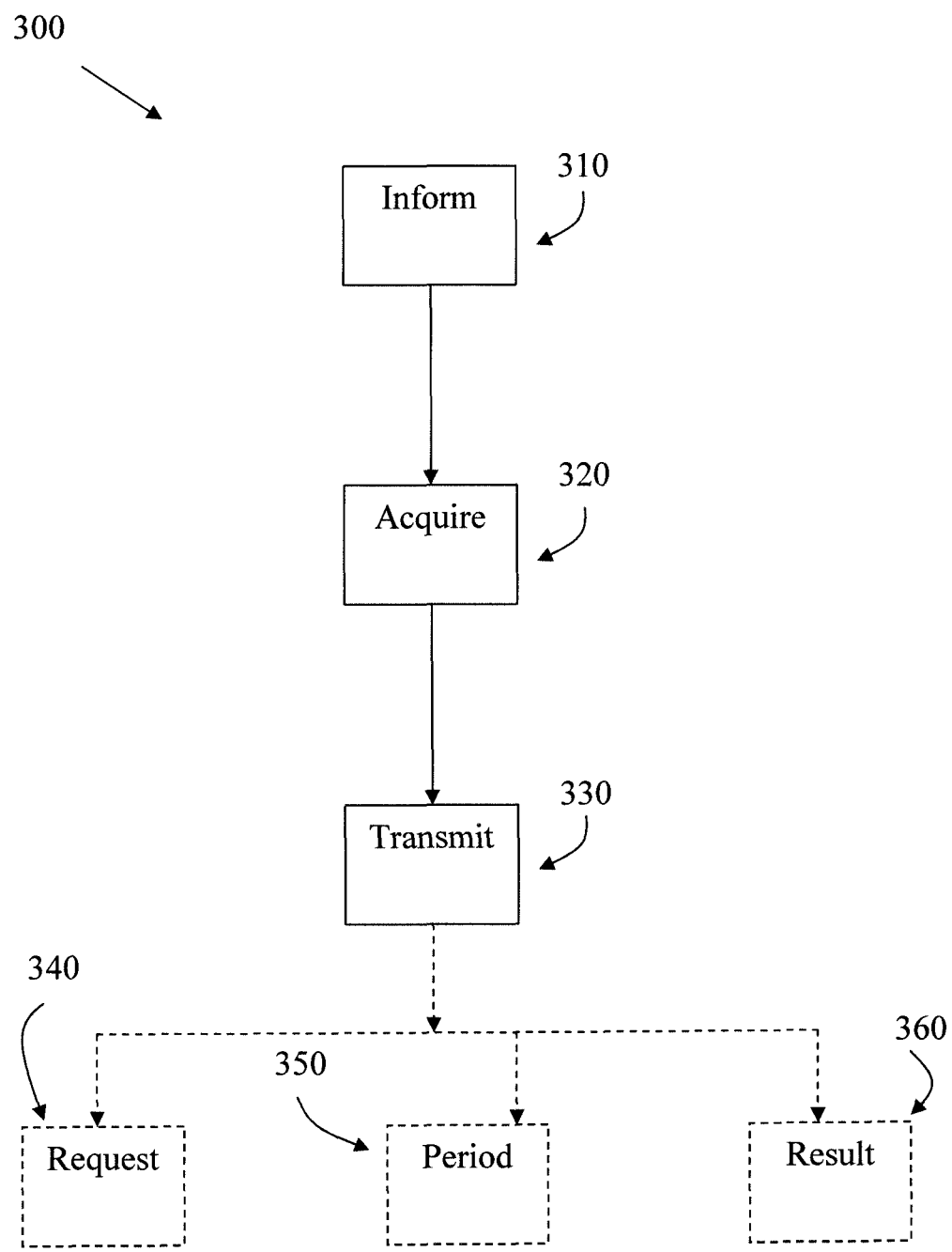
FIG. 3 shows a flow chart of a method of the invention.

FIG. 3 shows a schematic flow chart of steps of a method 300 of the invention. Steps which are alternatives or options are shown with dashed lines. As shown in step 310, the method 300 of the invention comprises letting a second BS such as the BS 123 of FIG. 1 inform a first BS such as the BS 113 of FIG. 1 that an update has taken place in the system information of the second BS.

Step 320 shows that the first BS 123 acquires the updated system information of the second BS 113, and step 330 shows that the first BS 113 transmits at least part of the updated system information of the second BS 123 to MSs in the cell of the first BS such as the MS 112 of FIG. 1.

Step 340 shows that the updated system information may be requested by the first BS 113 from the second BS 123 as a result of a message from the second BS that its system information has been updated. This can, for example be the CCC update of the DCD and/or the UCD, the CCC being included in the message Spare Capacity Report.

As shown in step 350, the second BS 123 transmits the message which comprises information about system updates, i.e. in this case the Spare Capacity Report, periodically, at predefined intervals, as an alternative to which, as shown in step 360, the message may be transmitted as the result of an update to the system information of the BS in question.

The invention is also directed towards a Base Station with functions according to the invention. A schematic block diagram of such a base station 400 is shown in FIG. 4.

Figure 4:
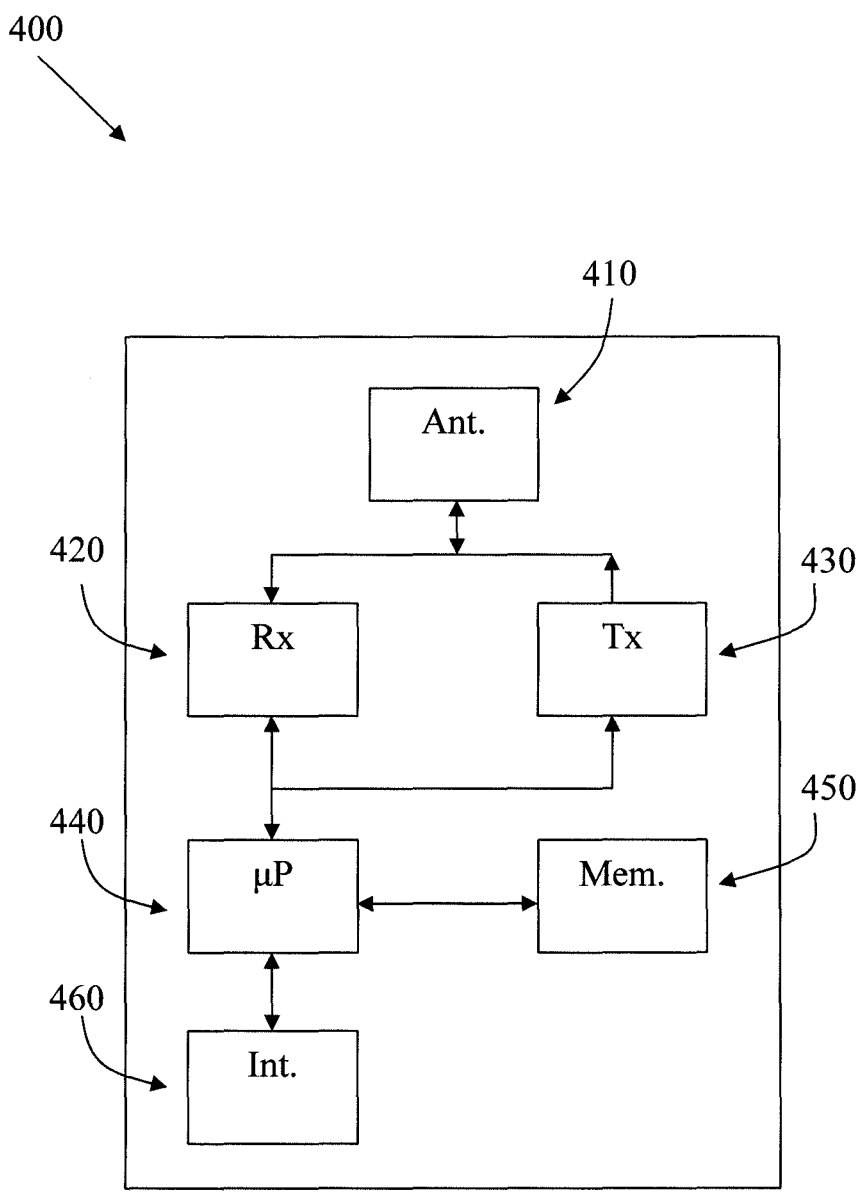
FIG. 4 shows a Base Station of the invention.

As can be seen in FIG. 4, the Base Station 400 of the invention comprises an antenna 410 for reception and transmission of information from/to the MSs in the cell of the Base Station. The Base Station 400 also comprises a receiver part, Rx, 420, a transmitter part Tx 430, a computer such as a microprocessor 440 and a memory 450. The Base Station 400 also comprises an interface 460 towards other nodes in the system, said interface being shown together with the antenna. This interface may be, for example, a landline interface, an interface towards networks such as the Internet etc.

The interface 460 can be used for receiving information from another Base Station in the system that an update has taken place in the system information of the other Base Station, and can also be used as means for acquiring the updated system information from the other Base Station, possibly also with the use of the computer 440 and the memory 450, the computer being used if computations or control of the interface is necessary, and the memory if stored data needs to be accessed, or if data needs to be stored. The information from the interface may also be routed via the computer 440.

The antenna 410 and the transmitter 430 can be used for transmitting all or at least parts of the updated system information of the other Base Station to MSs in the cell of the Base Station.

The computer 440, together with the interface 460 can be used for requesting updated system information from another Base Station as a result of a message from another Base Station that its system information has been updated.

The invention is not limited to the examples of embodiments described above and shown in the drawings, but may be freely varied within the scope of the appended claims. For example, in order to facilitate the reader's understanding of the invention, consistent mention is made in this text to a first and a second Base Station. This is not to be construed as meaning that the invention in any way is limited to systems with two Base Stations, it is merely an example given to facilitate the description and the understanding of the description. The invention can be used in a system with more or less any number of Base Stations, which exchange information about system updates in the manner described above between the first and the second Base Station.

The invention claimed is:

1. A method for use in a wireless cellular telecommunications system in which system there is a plurality of cells each of which can accommodate a number of users with mobile terminals (MSs), and in which system there is also a plurality of Base Stations (BSs) with the traffic to and from the MSs in a first cell being routed via a first BS and in which system an MS can be handed over from said first BS to a second BS of a second cell in the system, comprising the steps of:

informing, by the second BS to the first BS that an update has taken place in the system information of the second BS, wherein the informing step occurs independently of a determination that one or more MSs is to be handed over from said first BS to said second BS;

acquiring, by the first BS, the updated system information of the second BS;

transmitting, by the first BS, at least part of the updated system information of the second BS to MSs in the cell of the first BS; and wherein the updated system information comprises an updated Configuration Change Counts (CCC) of one or more of a control message for an uplink and a control message for a downlink; and wherein said updated system information is requested by the first BS from the second BS as a result of a message from the second BS that its system information has been updated.

2. The method of claim 1, wherein the second BS transmits said message periodically, at predefined intervals.

3. The method of claim 1, wherein the second BS transmits said message as a result of an update.

4. The method of claim 1, wherein the first BS acquires the updated system information of the second BS in a dedicated message.

5. The method of claim 1, wherein the first BS requests the updated system information from the second BS in a dedicated message.

6. A base station for use in a wireless cellular telecommunications system, the base station being equipped with means for routing the traffic to and from the mobile stations (MSs) in a cell in the system, the base station comprising:

receiver for receiving from a second base station, system information that an update has taken place in the second base station, wherein the information is received independently of a determination that one or more MSs is to be handed over from said first base station to said second base station;

acquisition means for acquiring said updated system information of said second base station; and transmitter for transmitting by the base station, at least part of said updated system information of said second base station to MSs in the cell of the base station;

wherein the updated system information comprises an updated Configuration Change Counts (CCC) of one or more of a control message for an uplink and a control message for a downlink; and wherein said updated system information is requested by the first BS from the second BS as a result of a message from the second BS that its system information has been updated.

7. The base station of claim 6, wherein the receiver receives said message at predefined intervals.

8. The base station of claim 6, further comprising means for acquiring said updated system information of said second base station in a dedicated message.

9. The base station of claim 6, comprising means for requesting said updated system information from said second base station in a dedicated message.

10. The base station of claim 6, comprising means for informing at least one other base station in the system that an update has taken place in the system information of the base station.

11. The base station of claim 10, wherein the transmitter transmits said information periodically, at predefined intervals.

12. The base station of claim 10, wherein the transmitter transmits said information as a result of an update.

13. The base station of claim 6, wherein the transmitter transmits its system information to at least one other base station as a result of a request from said at least one other base station.

14. The base station of claim 13, wherein the transmitter transmits said system information in a dedicated message.

15. The method of claim 1, wherein the control message for the uplink is an Uplink Channel Descriptor (UCD) and the control message for the downlink is a Downlink Channel Descriptor (DCD).

16. The base station of claim 6, wherein the control message for the uplink is an Uplink Channel Descriptor (UCD) and the control message for the downlink is a Downlink Channel Descriptor (DCD).

\* \* \* \* \*